P. E. HOLT.
TWO WHEELED DUMP WAGON.
APPLICATION FILED JULY 1, 1909.
1,017,972.
Patented Feb. 20, 1912.
2 SHEETS—SHEET 1.
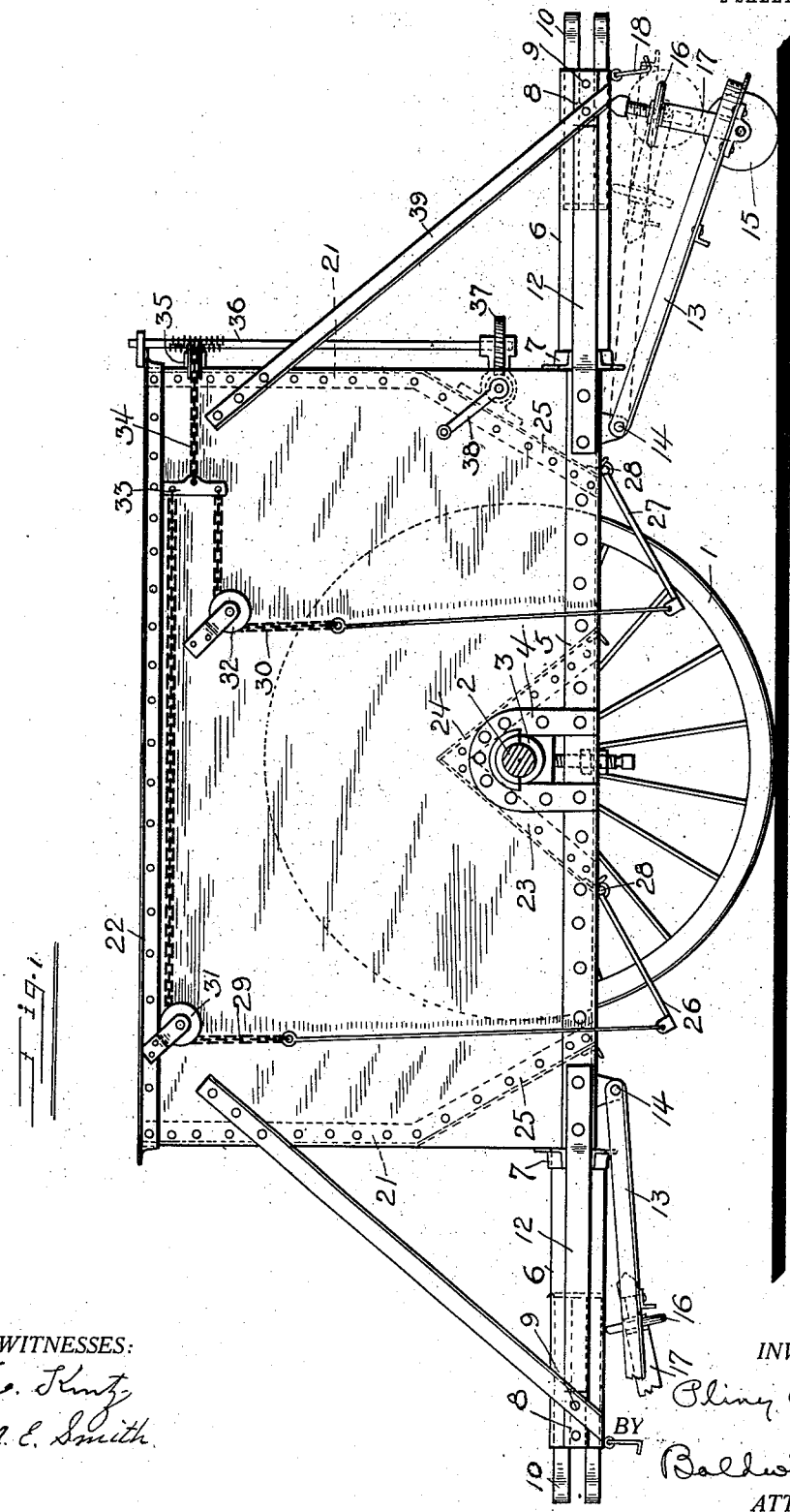
WITNESSES:
E. Kintz
M. E. Smith
INVENTOR.
Pliny E. Holt
BY Baldwin Vale
ATTORNEY.

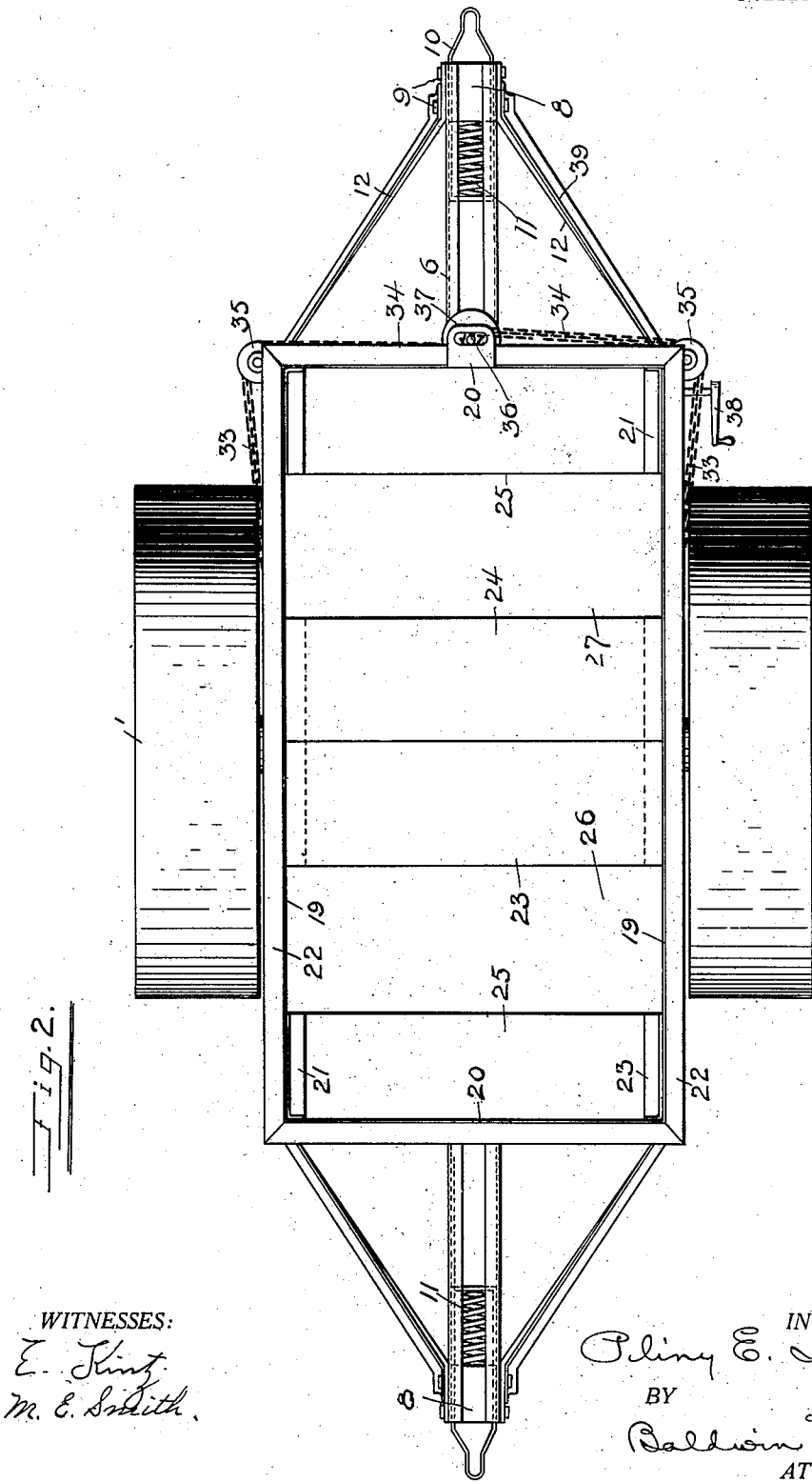

UNITED STATES PATENT OFFICE.

PLINY E. HOLT, OF STOCKTON, CALIFORNIA.

TWO-WHEELED DUMP-WAGON.

1,017,972.  Specification of Letters Patent.  Patented Feb. 20, 1912.

Application filed July 1, 1909. Serial No. 505,385.

*To all whom it may concern:*

Be it known that I, PLINY E. HOLT, a citizen of the United States, and residing at 836 West Poplar street, in the city of Stockton, county of San Joaquin, and State of California, have invented certain new and useful Improvements in Two-Wheeled Dump-Wagons; and I do hereby declare the following to be a full, clear, and exact description of the said invention, such as will enable others skilled in the art to which it most nearly appertains to make, use, and practice the same.

This invention relates to improvements in dump wagons and consists of the novel construction and arrangement of the parts as hereinafter described.

The object of this invention is to produce a two wheel bottom dump wagon particularly adapted to be drawn in either direction, to be trailed behind road tractors, and to be coupled together in trains capable of turning in a short radius without cramping.

Broadly, the invention consists of a two wheeled truck with its axle located approximately across the center of the wagon frame; spring drawheads located at each end of the wagon frame and provided with a collapsible trundle jack thereunder adapted to maintain the level of the frame when the wagon is uncoupled; an angular inclosed body built upon the wagon frame and having a double chute bottom closed by hinged doors operated by a compensated chain tackle and winch rotated by a worm gear operated by a hand lever at the side of the wagon.

In the drawings:—Figure 1 is a side elevation illustrating a dump wagon constructed in accordance with this invention. Fig. 2 is a plan view from above the same.

In detail, the construction consists of the supporting wheels 1, of suitable construction to meet road conditions and support the load on the axle. The wheels are mounted on the transverse axle 2, mounted in the journal boxes 3. The body of the wagon is supported from the axle by the yokes 4, riveted to the side plates 5 of the wagon frame. The wagon frame is composed of the side plates 5, joined across the ends by similar plates.

The drawheads comprise the draft bars 6 fixed at one end 7, to the end plates of the wagon frame, and joined at their outer ends by the blocks 8. These draft bars are composed of lengths of channel iron joined at their horizontal center by the bolts 9 extending through the blocks. The coupling links 10, are adjusted to slide between the blocks and the draft bars and engage the inner end of the coil buffer spring 11 which bears against the blocks 8. The draft bars are braced by the side stays 12, extending from the blocks 8 to their respective corners of the wagon frame. When uncoupled the ends of the wagon are supported by collapsible jacks provided at each end. The jacks comprise the swinging frame 13, hinged to the wagon frame, as at 14, and converging to the axis of the wheel 15, journaled therein; and an adjustable column comprising the hand wheel and stem 16, threaded in the yoke 17, pivoted on the axle of the trundle 15, and provided with the pointed head adapted to engage a notch (not shown) in the underside of the block 8, when in operative position. When not in use, the jack is collapsible and suspended by the hook 18, beneath the drawhead, as shown in dotted lines.

The body of the wagon is composed of the side panels 19, and the end panels 20, joined at the corners by the angle bars 21, to which they are both riveted. The top of the body is reinforced by the angle frame 22, riveted to the body panels. The side panels are riveted to the side plates 5, at the bottom and become a rigid part of the wagon frame. The bottom of the wagon body is composed of the inclined plates, 23 and 24, riveted to the side panels. These plates form an arch over the axle, and coöperate with the inbent ends 25, of the end panels to form two chutes in the bottom closed by the swinging doors 26 and 27, hinged to the bottom at the points 28. These doors are operated by the chains 29 and 30, attached to their respective doors on both sides of the wagon body, and passing over the sheaves 31 and 32, respectively, they are joined to opposite ends of the compensating bar 33, which is pivoted at its center to the chain 34, which passes over the sheaves 35, and is wound about the winch rod 36, which is bracketed to the wagon body and is rotated by the worm gear 37, actuated by the hand lever 38, which is mounted on the side of the wagon. The drawheads are braced to the wagon body by stays 39 extending from the sides near the top downward to the draft bars.

One of the wheels 1 is fixed upon the axle 2, which rotates freely in the journals 3; the other wheel is journaled on the axle upon which it rotates to allow for differential in rounding corners. This feature will form part of a separate application for patent to be filed later.

As illustrated, this wagon is adapted to an all-steel construction very desirable in this class of wagons. Being supported upon two wheels only, a train of these wagons is capable of following the turns and inequalities encountered in the ordinary road, and because of its lateral flexibility such a train can be turned within a very short radius.

The prime advantage of this invention is the adaptability of the wagon to be drawn in either direction. It often happens that there is not sufficient space to turn a wagon train, and under such circumstances the tractor can be uncoupled and hitched to the other end of the train. This condition is often met with where it is necessary to unload over elevated bunkers, or within a limited space, such as gravel pits, drifts, narrow roadways, etc.

Having thus described this invention what is claimed and desired to secure by Letters Patent is:—

1. The combination with a wagon body, of a draw head comprising two parallel bars secured at one end to the wagon body, a block rigidly secured between the outer ends of said bars, a spring and a link surrounding said block and spring and having its side arms slidably mounted between said block and bars, said link having its forward end extending beyond said block to form a coupling loop.

2. The combination with a wagon body, of a draw head comprising two bars secured at one end to the wagon body, a block rigidly secured between the outer ends of said bars and having grooves formed in its sides, a spring abutting the inner end of said block, and a link surrounding said block and spring and having its side arms disposed to slide in said grooves, said link having its outer end extending beyond said block to form a coupling loop.

3. The combination with a wagon body, of a draw head comprising two bars secured at one end to the wagon body, a block rigidly secured between the outer ends of said bars and having grooves formed in its sides, a spring abutting the inner end of said block, and a link surrounding said block and spring and having its side arms disposed to slide in said grooves and its outer end extending beyond said block to form a coupling loop, and side stays extending from said block to the corners of the wagon frame.

4. The combination with a wagon body, of a draw head comprising two bars secured at one end to the wagon body, a block rigidly secured between the outer ends of said bars and having grooves formed in its sides, a spring abutting the inner end of said block, a link surrounding said block and spring and having its side arms disposed to slide in said grooves and its outer end extending beyond said block to form a coupling loop, side stays extending from said block to the corners of the wagon frame, and a top stay extending from said block to the wagon body.

In testimony whereof, I have hereunto set my hand this 21st day of June 1909.

PLINY E. HOLT.

Witnesses:
JESSE VAN VALKENBURG,
PERCY S. SAUNDERS.